US006909278B2

United States Patent
Hernitscheck et al.

(10) Patent No.: US 6,909,278 B2
(45) Date of Patent: Jun. 21, 2005

(54) MOTION DETECTOR

(75) Inventors: Christian Hernitscheck, Grafenau-Haus (DE); Heinrich Pinta, Freising (DE); Stefan Schauer, Langenpreising (DE)

(73) Assignee: Texas Instruments Incorporated, Dallas, TX (US)

( * ) Notice: Subject to any disclaimer, the term of this patent is extended or adjusted under 35 U.S.C. 154(b) by 51 days.

(21) Appl. No.: 10/422,139

(22) Filed: Apr. 24, 2003

(65) Prior Publication Data

US 2004/0036463 A1 Feb. 26, 2004

(30) Foreign Application Priority Data

May 6, 2002  (DE) ........................................ 102 20 260

(51) Int. Cl.[7] ................................................ G01P 3/48
(52) U.S. Cl. ................................. 324/174; 324/207.25
(58) Field of Search ........................... 324/207.25, 135, 324/134, 154 R, 174, 207.22

(56) References Cited

U.S. PATENT DOCUMENTS 4,237,517 A  * 12/1980  Myers .......................... 361/239

FOREIGN PATENT DOCUMENTS

DE          004137695      * 5/1993

* cited by examiner

Primary Examiner—Jay Patidar
Assistant Examiner—Reena Aurora
(74) Attorney, Agent, or Firm—W. Daniel Swayze, Jr.; W. James Brady; Frederick J. Telecky, Jr.

(57) ABSTRACT

The motion detector includes at least one element moving at least temporarily, a circuit assembly for sensing the motional condition of the element comprising at least one sensor located adjoining the element and including a timed pulse activated oscillating circuit which is differingly damped depending on the motional condition of the element, a signal processing circuit for forming the signals of the oscillating circuit suitable for analysis in an analyzer receiving and analyzing the signals output by the signal processing circuit. The signal processing circuit of the motion detector includes a comparator, to the input of which at least the positive or negative half waves of the oscillating circuit signals are applied and to the other input of which a reference voltage is applied selected so that when the sensor is activated the output signal of the comparator changes its condition differingly frequently depending on the how the sensor is damped by the element.

8 Claims, 2 Drawing Sheets

US 6,909,278 B2

MOTION DETECTOR

BACKGROUND OF THE INVENTION

A motion detector of the prior art is described e.g. in DE 197 25 806 A1. The motion detector described in this document is a revolution detector in which the moving element is a rotor having at least two sectors of differing magnetic properties. The signal processing circuit in this known revolution detector consists of an RC pad which generates a dc signal from each train of oscillating signals produced when the oscillating circuit is pulse activated. The level of the dc signal continues to violate an input threshold of a microprocessor serving as the analyzer as long as the amplitudes of the oscillations violate a critical threshold value. Such a revolution detector may be employed, e.g. in consumption meters, e.g. in water meters.

One drawback of the signal processing circuit employed hitherto is that it is relatively complicated and thus cost-intensive, it being the capacitor used therein that is particularly the cause of this. Another drawback is that the time constant of the RC pad containing the capacitor alters with aging of the capacitor which in the worst case may even result in circuit failure. In addition to this, due to the relatively high time constants of the RC pad only low sampling rates are possible.

SUMMARY OF THE INVENTION

The objective of the present invention is thus to devise a motion detector of the aforementioned kind which overcomes the drawbacks involved hitherto in prior art motion detectors.

To achieve this objective the signal processing circuit of the motion detector in accordance with the invention includes a comparator, to the input of which at least the positive or negative half waves of the oscillating circuit signals are applied and to the other input of which a reference voltage is applied selected so that when the sensor is activated the output signal of the comparator changes its condition differingly frequently depending on the how the sensor is damped by the element.

This signal processing circuit eliminates the additional capacitor hitherto involved in prior art motion detectors and adding to the costs thereof. In addition, this solves the problem of the capacitor aging. Now, higher sampling rates are achieved with the motion detector since sensing can now occur much quicker, namely in but a few cycles of the oscillating circuit signal.

Advantageous aspects and further embodiments of the invention read from the further claims.

BRIEF DESCRIPTION OF THE DRAWINGS

Further features and advantages of the invention will now be detained in the following description of an example embodiment with reference to the drawings in which.

DETAILED DESCRIPTION OF THE DRAWINGS

Figure 1:
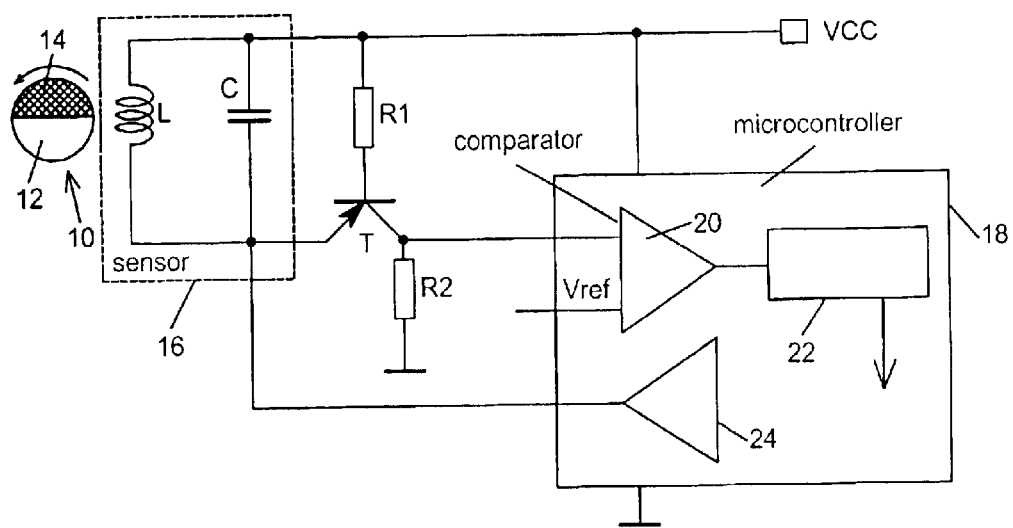
FIG. 1 is a block diagram of a motion detector in accordance with the invention, FIG. 2a are plots of the oscillating circuit signals with the sensor undamped and damped, FIG. 2b are plots of parts of the oscillating circuit signals applied to the input of the comparator.

Referring now to FIG. 1 there is illustrated a block diagram of a preferred embodiment of the motion detector in accordance with the invention.

The motion detector in accordance with the invention is a revolution detector as used e.g. in a water meter.

The disk-shaped rotor 10 as shown in FIG. 1 includes two sectors 12 and 14 having differing magnetic properties; for instance, sector 12 may be nonmagnetically damped whilst sector 14 is magnetically damped. Assigned to the rotor 10 is a fixedly mounted sensor 16 containing an oscillating circuit as shown diagrammatically in FIG. 1. An oscillating circuit is appreciated to have the property that it oscillates at its resonant frequency when pulse activated, the amplitude of the oscillation deteriorating aperiodically. How quickly this occurs depends on the Q of the oscillating circuit and external damping influences as is indicated e.g. in FIG. 2a. In the arrangement, as shown in FIG. 1, the non-magnetic sector 12 of the rotor exerts no or only a weak damping effect on the oscillating circuit of the sensor 16 while the magnetic sector 14 has a strong damping effect. Thus, the amplitudes of the oscillation of the oscillating circuit, once pulse activated, deteriorate slower or quicker, depending on which of the sectors 12 or 14 is in its vicinity.

Rotation of the rotor results in the signals furnished by the oscillating circuit as pulse activated at a certain point in time constituting a snapshot of the motional condition of the rotor 10, i.e. the signals indicating the angular position of the rotor 10 at this particular point in time of the sensor oscillating circuit being pulse activated. When on being pulse activated, the sensor outputs e.g. a signal which is only weakly damped, this means that the sector 12 was just in the region of the sensor at the point in time of pulse activation. By pulse activating the sensor 16 periodically and comparing two sensor signals in sequence, it can be established whether and by how much the motional condition of the rotor 10 has changed with time. This then enables the number of revolutions implemented as a whole by the rotor 10 to be established. In principle, just one sensor 16 is sufficient to sense revolution of the rotor 10. However, further sensors may be provided which e.g. may serve to detect the sense of rotation of the rotor 10. It is often the case that three or more sensors are provided, to be on the safe side as a standby should one or more sensors become defective. It is just as possible, however, to make use of a plurality of sensors to enhance the angular resolution in sensing.

The rotor 10 may be used e.g. in water metering in which it is connected to a water wheel, the number of revolutions or partial revolutions of which is then a measure of the waterflow through the meter, i.e. consumed.

Shown in addition on the right-hand side in FIG. 1 is a circuit assembly for sensing the motional condition of the rotor. This circuit assembly contains the sensor 16 comprising a parallel arrangement of an inductance L and a capacitor C. The oscillating circuit of the sensor 16 is connected to the potential of a dc supply voltage VCC.

Referring now to FIG. 1, there is illustrated a signal processing circuit serving to form the signals of the oscillating circuit suitable for processing by a microcontroller 18. The signal processing circuit includes a pnp transistor T whose base-emitter circuit is connected in parallel to the sensor oscillating circuit L,C. In this arrangement, the base of the transistor T features a dropping resistor R1 serving to set the base current to the desired level. In addition, the resistor R1 is connected to the supply voltage terminal VCC. The collector of the transistor T is connected via the further resistor R2, serving to set the collector current, to ground. The connecting point between the resistor R2 and the collector of the transistor T is connected to the first input of a comparator 20 representing the signal input of the microcontroller. Connected to the second input of the comparator 20 is a reference voltage Vref. Connected to the output of the comparator 20 is a logic circuit 22 which analyzes the output signals of the comparator 20 and outputs a corresponding signal to the microcontroller 18.

The microcontroller 18 is a microprocessor specially devised for the application in conjunction with a revolution detector, e.g. the commercially available Texas Instruments MSP 430. This handles analysis of the sensor signals and sequence control of the revolution detector as powered by the supply voltage VCC and connected to ground. In addition, it features the output 24 connected to the oscillating circuit L,C and via which the oscillating circuit is pulse activated timed by the microcontroller 18 by it being temporarily grounded.

The function of the revolution detector in accordance with the invention, more particularly the signal processing circuit will now be described with reference to the FIGS. 2a, 2b and 2c.

Figure 2:
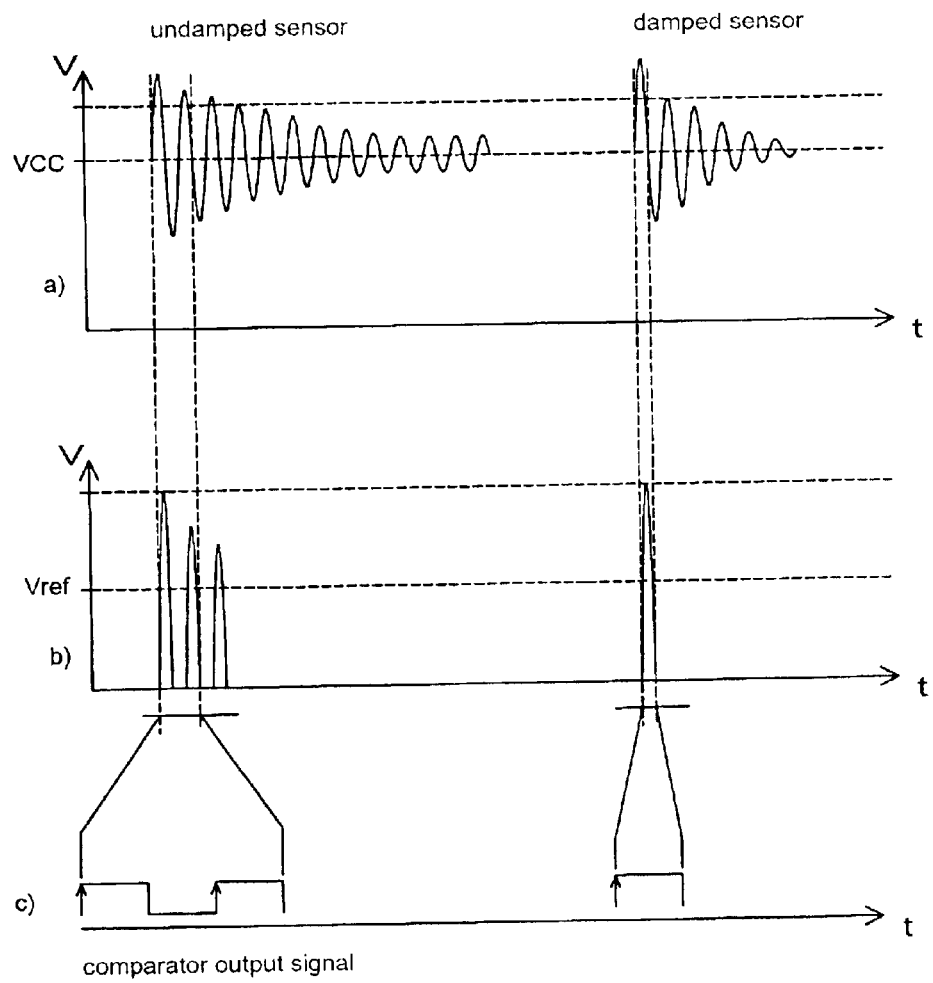
FIG. 2c is a plot of the output signal of the comparator with the sensor undamped and damped.

Referring now to FIG. 2a, there is illustrated how at the point in time designated by the broken line on the left, the microcontroller 18 signals pulse activation of the sensor 16 via its output 24 by it briefly connecting the sensor to ground. Assuming that the sensor at this point in time is positioned opposite the magnetically non-damping sector 12 of the rotor 10, its oscillating circuit L,C will then produce only a weakly damped oscillation as shown in the left-hand portion of the signal plot in FIG. 2a. In this arrangement, every time the voltage amplitude of the sensor signal exceeds the sum of the supply voltage VCC and the base emitter voltage VBE of the transistor T, transistor T is turned on. The resulting signal across the resistor R2 is shown in FIG. 2b. The positive half-waves of the oscillating circuit signal, as shown in FIG. 2b, are thus applied to the input of the comparator 20 at which they are compared to the previously set reference voltage Vref. When the positive half-wave exceeds the reference voltage Vref, the output signal of the comparator 20 is switched as illustrated in FIG. 2c showing the time profile of the output signal of the comparator. It is to be noted that the time scale in FIG. 2c is not the same as in FIGS. 2a and 2b.

The reference voltage Vref was previously set so that with the damped sensor only one positive half-wave appears at the input of the comparator as is evident on the right-hand side of FIG. 2b. When the sensor is damped, the output signal of the comparator thus changes its condition twice, i.e. it features a leading edge and a trailing edge as evident below in FIG. 2c on the right-hand side.

The output signal of the comparator 20 is analyzed by the logic circuit 22 which establishes how many leading edges occur in the output signal. If only one leading edge is detected, a bit having the value "0" is passed on to the microcontroller. From this, the microcontroller "sees" that a damped sensor is involved, i.e. it recognizing the motional condition of the rotor in appreciating that at the point in time of pulse activation, the sector 14 was alongside the sensor 16.

When the sensor is undamped, several positive half-waves appear at the input of the comparator via the transistor T, so that the condition of the output signal of the comparator changes more than twice. This is illustrated in FIG. 2c on the lefthand side. The logic circuit now "sees" that not only one, but two or more leading edges are involved. In this case, it outputs a bit having the value "1" to the microcontroller 18 which is informed thereby that the non-damping sector 12 of the rotor 10 was alongside the sensor 16 at the point in time of sensing.

Thus, by analyzing the signals received by the logic circuit the microcontroller 18 is able to "see" which rotor sector is opposite the sensor at the point in time of it being pulse activated.

For detecting the motional condition of the rotor at least two analysis cycles need to be implemented since it is only by comparing the signals received in the two analysis cycles in sequence that it is possible to detect whether a change has occurred in the position of the rotor 10 or not.

By comparing the bits of information established at the differing points in time of pulse activation for the sensor and as output by the logic circuit, the microcontroller 18 is able to "see" that a revolution of the rotor 10 has occurred, it then incrementing a count representing, for example, water consumption.

It will, of course, readily be appreciated that the principle of the signal processing circuit in accordance with the invention can be put to use even when the sensors are arranged in a completely different way as regards the sectors, e.g. in a linear arrangement of the sectors and the sensors move past the sectors in a straight-line motion.

In accordance with a further embodiment of the invention, the circuit for detecting the motional condition of the element (rotor) may be configured so that the reference voltage can be varied at an input of the comparator. This may be desirable, e.g. when aging changes the properties of the components (L,C) making up the sensor and thus necessitating the reference voltage to be reset. Setting the reference voltage may also be done automatically by the microcontroller itself which, should it be unable to obtain any reasonable results of sensing, can attempt by trial-and-error to successively change the reference voltage until the results again become reasonable. For this purpose a digital/analog converter may be provided whose output is connected to the input of the comparator and via which the microcontroller undertakes setting the reference voltage.

The above embodiment as described may, of course, be modified in many various ways. Thus, for instance, the pnp transistor T may be eliminated. The oscillating circuit signals may also be applied directly to the one input of the comparator 20 so that not only the positive half-waves but also the negative half-waves of the oscillating circuit signal attain the comparator. In another alternative embodiment, for instance, only the negative half-waves may be compared to a negative reference voltage. Positive and negative half-waves in the sense of the present description are understood to be the two half waves belonging to the cycle of one complete oscillation of the oscillating circuit irrespective of this featuring a positive or a negative voltage.

What is claimed is:

1. A motion detector including at least one element (10) moving at least temporarily, a circuit assembly for sensing the motion condition of said element (10) comprising:

at least one sensor located adjoining said element (10);

a timed pulse activated oscillating circuit (L, C) which is variably damped depending on said motional condition of said element (10);

a signal processing circuit (R1, R2, T, 20, 22) for forming the signals of said oscillating circuit suitable for analysis in an analyzer (18) receiving and analyzing said signals output by said signal processing circuit (R1, R2, T, 20, 22), wherein said signal processing circuit (R1, R2, T, 20, 22) includes a comparator (20) having an input for application of at least the positive or negative half waves of said oscillating circuit signals and an other input for application of a reference voltage (Vref) and selected so that when said sensor (16) is activated, the output signal of said comparator (20) changes its condition depending on how said sensor (16) is damped by said element (10).

2. The motion detector as in claim 1 wherein said signal processing circuit additionally includes a logic circuit (22) connected to the output of said comparator (20), said output serving to establishing the number of changes in condition of said output signal by detecting the number of leading and/or trailing edges of said output signal of said comparator (20) and passing on this information to said analyzer (18) which obtains the motional condition of said element (10) on the basis of this information.

3. The motion detector as in claim 2 wherein said reference voltage (Vref) is selected so that the condition of the output signal of said comparator (20) changes twice for a damped sensor (16).

4. The motion detector as in claim 1 wherein said reference voltage (Vref) can be varied.

5. The motion detector as in claim 4 wherein said analyzer (18) is configured so that said reference voltage (Vref) is automatically compensated for a change in the properties of the components of said sensor (16).

6. The motion detector as in claim 1 wherein said motion detector is a revolution detector.

7. The motion detector as in claim 6 wherein said element is a rotor (10) having at least two sectors (12, 14) having differing magnetic properties.

8. The motion detector as in claim 1 wherein said analyzer is a microcontroller (18).

* * * * *